(12) United States Patent
Li

(10) Patent No.: US 11,562,375 B2
(45) Date of Patent: Jan. 24, 2023

(54) BLOCKCHAIN-BASED DATA VERIFICATION METHOD, APPARATUS, AND ELECTRONIC DEVICE

(71) Applicant: Advanced New Technologies Co., Ltd., Grand Cayman (KY)

(72) Inventor: Shubo Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/086,211

(22) Filed: Oct. 30, 2020

(65) Prior Publication Data

US 2021/0049617 A1    Feb. 18, 2021

Related U.S. Application Data

(63) Continuation of application No. PCT/CN2019/101082, filed on Aug. 16, 2019.

(30) Foreign Application Priority Data

Sep. 30, 2018  (CN) .......................... 201811160051.5

(51) Int. Cl.
*G06Q 30/00* (2012.01)
*G06F 16/903* (2019.01)
(Continued)

(52) U.S. Cl.
CPC ... *G06Q 30/0185* (2013.01); *G06F 16/90339* (2019.01); *H04L 9/0866* (2013.01);
(Continued)

(58) Field of Classification Search
CPC ........... G06Q 30/0185; G06Q 20/4016; G06Q 2220/00; G06Q 20/02; G06Q 30/018;
(Continued)

(56) References Cited

U.S. PATENT DOCUMENTS 6,959,382 B1 * 10/2005 Kinnis .................. H04L 9/3247
                                                713/168
7,277,601 B2 * 10/2007 Zorab ...................... G07F 7/08
                                                705/50
(Continued)

FOREIGN PATENT DOCUMENTS

CN       106209877       12/2016
CN       106780007        5/2017
(Continued)

OTHER PUBLICATIONS

R. Kumar and R. Tripathi, "Traceability of counterfeit medicine supply chain through Blockchain," 2019 11th International Conference on Communication Systems & Networks (COMSNETS), 2019, pp. 568-570, doi: 10.1109/COMSNETS.2019.8711418. (Year: 2019).*

(Continued)

*Primary Examiner* — Neha Patel
*Assistant Examiner* — Jahed Ali
(74) *Attorney, Agent, or Firm* — Fish & Richardson P.C.

(57) ABSTRACT

The present application provides blockchain-based anti-counterfeiting methods, apparatuses, and systems. One method includes: obtaining an anti-counterfeiting verification request submitted by a user for a product; initiating anti-counterfeiting verification of the product in response to the anti-counterfeiting verification request, wherein the anti-counterfeiting verification comprises integrity verification of anti-counterfeiting information generated by a plurality of anti-counterfeiting participants on a blockchain, wherein the anti-counterfeiting information comprises a plurality of types of anti-counterfeiting identification information corresponding to the product; and returning an anti-counterfeiting verification result for the product to the user.

18 Claims, 4 Drawing Sheets

(51) Int. Cl.
*H04L 9/08* (2006.01)
*H04L 9/00* (2022.01)

(52) U.S. Cl.
CPC ............ *H04L 9/50* (2022.05); *H04L 2209/26* (2013.01); *H04L 2209/463* (2013.01)

(58) Field of Classification Search
CPC ................ G06Q 20/223; G06Q 20/382; G06F 16/90339; H04L 9/0866; H04L 2209/26; H04L 2209/38; H04L 2209/463
See application file for complete search history.

(56) References Cited

U.S. PATENT DOCUMENTS

| | | | | |
|---|---|---|---|---|
| 7,651,031 | B2* | 1/2010 | Berson | G06K 7/12 235/491 |
| 8,495,736 | B2* | 7/2013 | Dill | H04L 63/20 713/176 |
| 9,021,051 | B1* | 4/2015 | Taller | G06F 16/325 709/213 |
| 10,026,118 | B2 | 7/2018 | Castinado et al. | |
| 10,250,381 | B1* | 4/2019 | Rice | G06F 16/1805 |
| 10,776,761 | B2* | 9/2020 | MacGregor | G06Q 20/10 |
| 2003/0084298 | A1* | 5/2003 | Messerges | H04L 9/3236 713/176 |
| 2005/0061878 | A1* | 3/2005 | Barenburg | G07G 1/0045 235/385 |
| 2007/0022293 | A1* | 1/2007 | Hayashi | G06F 21/64 713/176 |
| 2007/0143619 | A1* | 6/2007 | Goodman | H04L 63/123 713/181 |
| 2008/0140660 | A1* | 6/2008 | Masuda | G06F 16/1873 |
| 2010/0138446 | A1* | 6/2010 | Canessa | G06F 15/16 707/770 |
| 2015/0161153 | A1* | 6/2015 | Gheith | G06F 3/067 707/695 |
| 2017/0206532 | A1* | 7/2017 | Choi | G06Q 30/02 |
| 2017/0243286 | A1* | 8/2017 | Castinado | H04L 63/08 |
| 2017/0289151 | A1* | 10/2017 | Shanahan | G06F 21/53 |
| 2018/0089256 | A1* | 3/2018 | Wright, Sr. | G06F 16/2379 |
| 2018/0117446 | A1* | 5/2018 | Tran | A42B 3/0433 |
| 2018/0232731 | A1* | 8/2018 | Liu | G06Q 20/02 |
| 2018/0240114 | A1* | 8/2018 | Li | G06Q 20/401 |
| 2018/0276600 | A1* | 9/2018 | Fuller | H04L 9/3236 |
| 2018/0343126 | A1* | 11/2018 | Fallah | H04L 9/006 |
| 2019/0088063 | A1* | 3/2019 | Unagami | H04L 9/3239 |
| 2019/0213462 | A1* | 7/2019 | McDonald | G06Q 10/0833 |
| 2019/0228420 | A1* | 7/2019 | Cai | G06F 16/951 |
| 2020/0202364 | A1* | 6/2020 | Du | G06Q 30/0185 |
| 2021/0049617 | A1* | 2/2021 | Li | G06F 16/90339 |

FOREIGN PATENT DOCUMENTS

| | | | | |
|---|---|---|---|---|
| CN | 106790253 | | 5/2017 | |
| CN | 107038587 | | 8/2017 | |
| CN | 107169776 | | 9/2017 | |
| CN | 107196966 | | 9/2017 | |
| CN | 107220836 | | 9/2017 | |
| CN | 107273410 | | 10/2017 | |
| CN | 107566360 | | 1/2018 | |
| CN | 107705134 | | 2/2018 | |
| CN | 108023893 | | 5/2018 | |
| CN | 108364182 | | 8/2018 | |
| CN | 108389129 | | 8/2018 | |
| CN | 108492119 | | 9/2018 | |
| CN | 108898389 | | 11/2018 | |
| CN | 109598147 | | 4/2019 | |
| CN | 109598518 | | 4/2019 | |
| CN | 110691066 | A * | 1/2020 | ............ G06Q 20/383 |
| TW | 201812638 | | 4/2018 | |
| TW | M561279 | | 6/2018 | |
| TW | M565363 | | 8/2018 | |
| WO | WO-2020087447 | A1 * | 5/2020 | ............ G06Q 30/00 |

OTHER PUBLICATIONS

X. Yao, X. Zhou and J. Ma, "Object event visibility for anti-counterfeiting in RFID-enabled product supply chains," 2015 Science and Information Conference (SAI), 2015, pp. 141-150, doi: 10.1109/SAI.2015.7237138. (Year: 2015).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/092895, dated Oct. 8, 2019, 9 pages (with partial English translation).

PCT International Search Report and Written Opinion in International Application No. PCT/CN2019/101082, dated Oct. 28, 2019, 10 pages (with partial English translation).

European Search Report in European Application No. 19867818.7, dated Jun. 7, 2021, 9 pages.

Hepp et al., "Securing Physical Assets on the Blockchain: Linking a novel Object Indentification Concept with Distributed Ledgers," Proceedings of the 1st Workshop on Cryptocurrencies and Blockchains for Distributed Systems, Jun. 2018, pp. 60-65.

* cited by examiner

BLOCKCHAIN-BASED DATA VERIFICATION METHOD, APPARATUS, AND ELECTRONIC DEVICE

CROSS-REFERENCE TO RELATED APPLICATIONS

This application is a continuation of PCT Application No. PCT/CN2019/101082, filed on Aug. 16, 2019, which claims priority to Chinese Patent Application No. 201811160051.5, filed on Sep. 30, 2018, and each application is hereby incorporated by reference in its entirety.

TECHNICAL FIELD

One or more embodiments of the present application relate to the blockchain field, and in particular, to anti-counterfeiting methods, apparatuses, and electronic devices.

BACKGROUND

A blockchain technology, also referred to as a distributed ledger technology, is a new technology in which a plurality of computing devices participate in "accounting" to maintain a complete distributed database. The blockchain technology has been widely used in many fields because of its features such as decentralization, openness and transparency, and participation of each computing device in recording data in a database, and fast data synchronization between computing devices.

SUMMARY

The present application provides a blockchain-based anti-counterfeiting method, where the blockchain stores anti-counterfeiting information corresponding to a target product, and the anti-counterfeiting information includes a plurality of types of anti-counterfeiting identification information that correspond to the target product and are stored in the blockchain by a plurality of anti-counterfeiting participants. The method includes: obtaining an anti-counterfeiting verification request submitted by a user for the target product; initiating an anti-counterfeiting verification on the target product in response to the anti-counterfeiting verification request, where the anti-counterfeiting verification includes at least an integrity verification on the anti-counterfeiting information; and returning an anti-counterfeiting verification result for the target product to the user.

Optionally, the anti-counterfeiting information includes an anti-counterfeiting identification code generated by the anti-counterfeiting authority for the target product, and at least one type of anti-counterfeiting identification information that is generated by other anti-counterfeiting participants and stored in association with the anti-counterfeiting identification code.

Optionally, the target product is attached with an anti-counterfeiting label generated based on the anti-counterfeiting identification code; and the anti-counterfeiting verification request includes the anti-counterfeiting identification code obtained by a user by scanning the anti-counterfeiting label; and initiating an anti-counterfeiting verification on the target product in response to the anti-counterfeiting verification request includes: initiating a query in the blockchain based on the anti-counterfeiting identification code in the anti-counterfeiting verification request in response to the anti-counterfeiting verification request, to detect the at least one type of anti-counterfeiting identification information that is generated by other anti-counterfeiting participants and stored in association with the anti-counterfeiting identification code; and determining that the target product passes the anti-counterfeiting verification if the at least one type of anti-counterfeiting identification information that is generated by other anti-counterfeiting participants and stored in association with the anti-counterfeiting identification code is detected.

Optionally, before initiating a query in the blockchain based on the anti-counterfeiting identification code in the anti-counterfeiting verification request, the method further includes: performing a validity verification on the anti-counterfeiting identification code in the anti-counterfeiting verification request; and further initiating a query in the blockchain based on the anti-counterfeiting identification code if the anti-counterfeiting identification code passes the validity verification.

Optionally, determining that the target product passes the anti-counterfeiting verification if the at least one type of anti-counterfeiting identification information that is generated by other anti-counterfeiting participants and stored in association with the anti-counterfeiting identification code is detected further includes: further performing a validity verification on the at least one type of anti-counterfeiting identification information that is generated by other anti-counterfeiting participants if the blockchain stores the at least one type of anti-counterfeiting identification information that is generated by other anti-counterfeiting participants and stored in association with the anti-counterfeiting identification code; and determining that the target product passes the anti-counterfeiting verification if the at least one type of anti-counterfeiting identification information that is generated by other anti-counterfeiting participants passes the validity verification.

Optionally, the method further includes: generating a user scanning record for the anti-counterfeiting label in response to the user scanning operation for the anti-counterfeiting label; and publishing the generated scanning record to the blockchain for storage.

Optionally, other anti-counterfeiting participants include key participants corresponding to all stages in the product life cycle of the target product; and the at least one type of anti-counterfeiting identification information that is generated by other anti-counterfeiting participants includes product descriptions related to all stages in the product life cycle of the target product.

Optionally, the key participants include a production organization and an inspection organization of the target product; and the at least one type of anti-counterfeiting identification information that is generated by other anti-counterfeiting participants includes a data digest of production information of the target product and a data digest of an inspection report of the target product.

Optionally, the production information of the target product and the inspection report of the target product are stored in a third-party storage system interfaced with the blockchain, where the third-party storage system is a content addressable storage system.

Optionally, the blockchain is a consortium blockchain.

The present application further provides a blockchain-based anti-counterfeiting apparatus, where the blockchain stores anti-counterfeiting information corresponding to a target product, and the anti-counterfeiting information includes a plurality of types of anti-counterfeiting identification information that correspond to the target product and are stored in the blockchain by a plurality of anti-counterfeiting participants. The apparatus includes: an acquisition module, configured to obtain an anti-counterfeiting verification request submitted by a user for the target product; a verification module, configured to initiate an anti-counterfeiting verification on the target product in response to the anti-counterfeiting verification request, where the anti-counterfeiting verification includes at least an integrity verification on the anti-counterfeiting information; and a return module, configured to return an anti-counterfeiting verification result for the target product to the user.

Optionally, the anti-counterfeiting information includes an anti-counterfeiting identification code generated by the anti-counterfeiting authority for the target product, and at least one type of anti-counterfeiting identification information that is generated by other anti-counterfeiting participants and stored in association with the anti-counterfeiting identification code.

Optionally, the target product is attached with an anti-counterfeiting label generated based on the anti-counterfeiting identification code; and the anti-counterfeiting verification request includes the anti-counterfeiting identification code obtained by a user by scanning the anti-counterfeiting label; and the verification module is configured to: initiate a query in the blockchain based on the anti-counterfeiting identification code in the anti-counterfeiting verification request in response to the anti-counterfeiting verification request, to detect the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants and stored in association with the anti-counterfeiting identification code is detected.

Optionally, the verification module is further configured to: before initiating a query in the blockchain based on the anti-counterfeiting identification code in the anti-counterfeiting verification request, perform a validity verification on the anti-counterfeiting identification code in the anti-counterfeiting verification request; and further initiate a query in the blockchain based on the anti-counterfeiting identification code if the anti-counterfeiting identification code passes the validity verification.

Optionally, the verification module is further configured to: further perform a validity verification on the at least one type of anti-counterfeiting identification information that is generated by other anti-counterfeiting participants if the blockchain stores the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants passes the validity verification.

Optionally, the apparatus further includes: a generation module, configured to: generate a user scanning record for the anti-counterfeiting label in response to the user scanning operation for the anti-counterfeiting label; and publish the generated scanning record to the blockchain for storage.

Optionally, other anti-counterfeiting participants include key participants corresponding to all stages in the product life cycle of the target product; and the at least one type of anti-counterfeiting identification information that is generated by other anti-counterfeiting participants includes product descriptions related to all stages in the product life cycle of the target product.

Optionally, the key participants include a production organization and an inspection organization of the target product; and the at least one type of anti-counterfeiting identification information that is generated by other anti-counterfeiting participants includes a data digest of production information of the target product and a data digest of an inspection report of the target product.

Optionally, the production information of the target product and the inspection report of the target product are stored in a third-party storage system interfaced with the blockchain, where the third-party storage system is a content addressable storage system.

Optionally, the blockchain is a consortium blockchain.

The present application further provides an electronic device, including: a processor; and a memory, configured to store machine executable instructions; where by reading and executing the machine executable instructions that are stored in the memory and that correspond to an anti-counterfeiting logic for blockchain-based anti-counterfeiting, the processor is enabled to: obtain an anti-counterfeiting verification request submitted by a user for the target product, where the blockchain stores anti-counterfeiting information corresponding to a target product, and the anti-counterfeiting information includes a plurality of types of anti-counterfeiting identification information that correspond to the target product and are stored in the blockchain by a plurality of anti-counterfeiting participants; initiate an anti-counterfeiting verification on the target product in response to the anti-counterfeiting verification request, where the anti-counterfeiting verification includes at least an integrity verification on the anti-counterfeiting information; and return an anti-counterfeiting verification result for the target product to the user.

According to the previous embodiments, the anti-counterfeiting information related to the target product that is stored in the blockchain includes a plurality of types of anti-counterfeiting identification information that correspond to the target product and is stored in the blockchain by a plurality of anti-counterfeiting participants; in addition, an integrity verification on the anti-counterfeiting information stored in the blockchain is included in the anti-counterfeiting verification on the target product; and therefore, even if some of true anti-counterfeiting identification information among a plurality of types of anti-counterfeiting identification information is leaked, the anti-counterfeiting identification information generated for a fake or counterfeit product based on the leaked anti-counterfeiting identification information cannot pass the integrity verification of the anti-counterfeiting information for the product, so that the security level of the product anti-counterfeiting is significantly improved.

DESCRIPTION OF EMBODIMENTS

Figure 1:
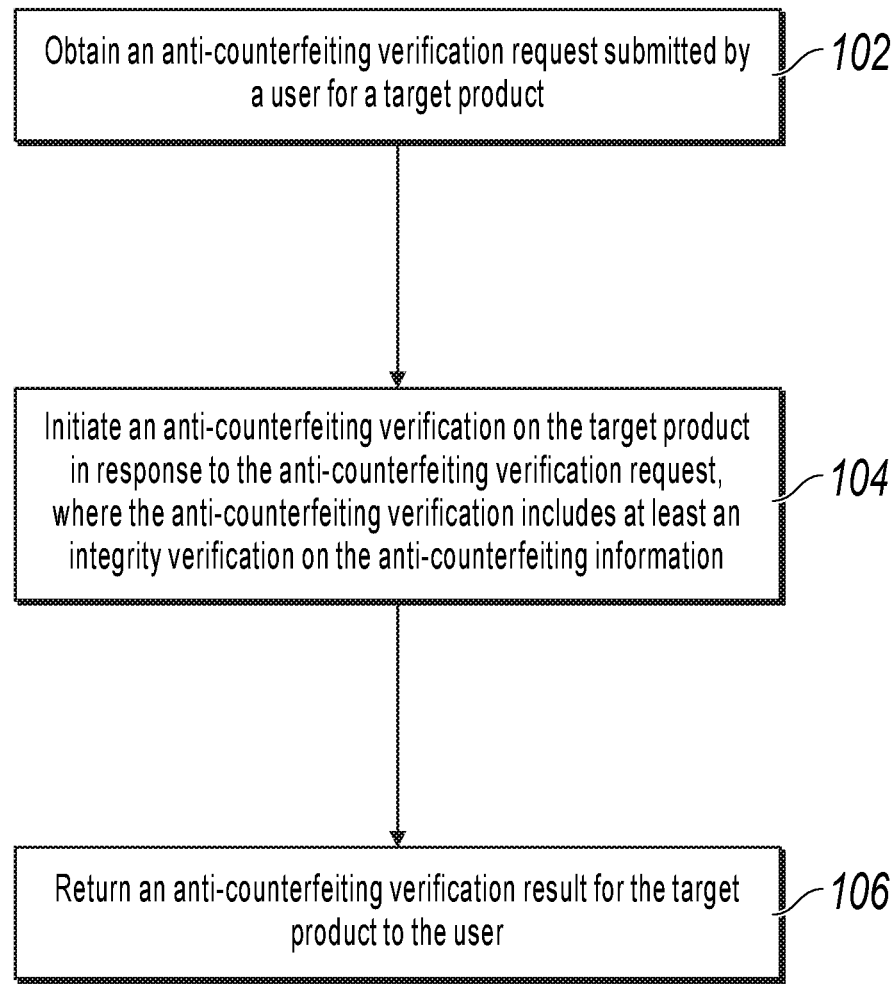
FIG. 1 is a flowchart illustrating a blockchain-based anti-counterfeiting method, according to an example embodiment.

In some scenarios, a production organization of a product usually creates an anti-counterfeiting label for the product based on anti-counterfeiting identification information (such as an anti-counterfeiting identification code) generated for the product by a third-party authority (such as an anti-counterfeiting authority), and attaches the anti-counterfeiting label to the outer surface of the product.

When the product is transferred to a consumer, the consumer can obtain the anti-counterfeiting identification information by scanning the anti-counterfeiting label attached to the outer surface of the product using the terminal device, and then initiate validity verification of the obtained anti-counterfeiting identification information to confirm whether the product is a fake or counterfeit product.

In this scenario, once the related data used by the third-party authority to generate the anti-counterfeiting identification information is leaked, a counterfeiter of the product can use the leaked data to generate a legal anti-counterfeiting label for a fake or counterfeit product, and sell the fake or counterfeit product to a consumer as a genuine product, causing losses to the consumer.

Accordingly, the present application provides a technical solution for constructing anti-counterfeiting information related to a target product based on a plurality of types of anti-counterfeiting identification information that are stored in a blockchain by a plurality of anti-counterfeiting participants, and improving a security level of anti-counterfeiting of the product by including an integrity verification on the anti-counterfeiting information in the anti-counterfeiting verification on the target product.

During implementation, the anti-counterfeiting participants of the target product no longer needs to cover only a single authority but include a plurality of anti-counterfeiting participants. Each anti-counterfeiting participant can store the anti-counterfeiting identification information that is generated by the anti-counterfeiting participant for the target product in a blockchain in the form of a transaction. The application client device can use a plurality of types of anti-counterfeiting identification information that correspond to the target product and are stored in the blockchain by a plurality of anti-counterfeiting participants to constitute anti-counterfeiting information corresponding to the target product.

For example, the plurality of anti-counterfeiting participants can specifically include an anti-counterfeiting authority, and at least one of other anti-counterfeiting participants. In this scenario, the anti-counterfeiting information can specifically include an anti-counterfeiting identification code generated by the anti-counterfeiting authority for the target product, and at least one type of anti-counterfeiting identification information that is generated by other anti-counterfeiting participants stored in association with the anti-counterfeiting identification code; where other anti-counterfeiting participants can be key participants corresponding to all stages in the product life cycle of the target product; for example, the key participants can be, in particular, a production organization, an inspection organization, etc. of the target product. In this scenario, the anti-counterfeiting information can specifically include an anti-counterfeiting identification code of the target product, a data digest of production information of the target product, and a data digest of an inspection report of the target product.

When the target product is transferred to a consumer, the consumer can obtain at least one type of anti-counterfeiting identification information of the plurality of anti-counterfeiting identification information through a terminal device, and then construct an anti-counterfeiting verification request for the target product based on the obtained anti-counterfeiting identification information.

For example, in practice, the production organization of the target product can construct an anti-counterfeiting label (for example, the anti-counterfeiting label can be specifically an RFID label or a QR code label) for the target product based on the anti-counterfeiting identification code generated by the anti-counterfeiting authority for the target product, and attach the anti-counterfeiting label to the outer surface of the target product when the target product is shipped.

When the target product is transferred to the consumer, the consumer can obtain the anti-counterfeiting identification code by scanning the anti-counterfeiting label through a terminal device, construct an anti-counterfeiting verification request for the target product based on the obtained anti-counterfeiting identification code, and then submit the anti-counterfeiting verification request to an application client device.

After receiving the anti-counterfeiting verification request for the target product, the application client device can initiate an anti-counterfeiting verification on the target product based on the anti-counterfeiting identification information carried in the anti-counterfeiting verification request, where the anti-counterfeiting verification on the target product needs to include at least an integrity verification on the anti-counterfeiting information that corresponds to the target product and is stored in the blockchain. After completing the anti-counterfeiting verification on the target product, the application client device can return an anti-counterfeiting verification result to the user.

In the previous technical solutions, the anti-counterfeiting information related to the target product that is stored in the blockchain includes a plurality of types of anti-counterfeiting identification information that correspond to the target product and is stored in the blockchain by a plurality of anti-counterfeiting participants; in addition, an integrity verification on the anti-counterfeiting information stored in the blockchain is included in the anti-counterfeiting verification on the target product; and therefore, even if some of true anti-counterfeiting identification information among a plurality of types of anti-counterfeiting identification information is leaked, the anti-counterfeiting identification information generated for a fake or counterfeit product based on the leaked anti-counterfeiting identification information cannot pass the integrity verification of the anti-counterfeiting information for the product, so that the security level of the product anti-counterfeiting is significantly improved.

The following describes the present application by using the embodiments and with reference to the specific application scenarios.

FIG. 1 illustrates a blockchain-based anti-counterfeiting method according to an embodiment of the present application, where the method is applied to an application client device; the blockchain stores anti-counterfeiting information corresponding to the target product; and the anti-counterfeiting information includes a plurality of types of anti-counterfeiting identification information that correspond to the target product and are stored in a blockchain by a plurality of anti-counterfeiting participants. The method includes the following steps:

Step 102: Obtaining an anti-counterfeiting verification request submitted by a user for the target product.

Step 104: Initiate an anti-counterfeiting verification on the target product in response to the anti-counterfeiting verification request, where the anti-counterfeiting verification includes at least an integrity verification on the anti-counterfeiting information.

Step 106: Return an anti-counterfeiting verification result for the target product to the user.

The blockchain described in the present application can be a public blockchain, a private blockchain, a consortium blockchain, etc., which is not limited in the present application.

For example, in one scenario, the blockchain can be specifically a consortium blockchain including members such as an anti-counterfeiting authority, a production organization, and an inspection organization (or a management organization) of the target product, where the operator of the consortium blockchain can deploy an anti-counterfeiting verification service for the target product based on the consortium blockchain, and the anti-counterfeiting authority, production organization, and inspection organization can be used as service nodes of the anti-counterfeiting verification service. Each service node can publish, in the form of a transaction, the anti-counterfeiting identification information related to the target product that is generated by the service node in the consortium blockchain, and store the transaction in the distributed database in the consortium blockchain after the transaction passes through the consensus processing of the consensus node in the consortium blockchain, so as to complete publishing of the anti-counterfeiting identification information to the blockchain.

It is worthwhile to note that the transaction described in the present application refers to a group of data that is created by a user through a blockchain and that needs to be finally sent to the distributed database in the blockchain.

A transaction in the blockchain has a narrow sense and a broad sense. In a narrow sense, a transaction refers to a value transfer initiated to a user to the blockchain. For example, in a conventional bitcoin blockchain network, a transaction can be a transfer initiated by a user in the blockchain. In a broad sense, a transaction refers to a group of data that is published by a user to the blockchain and that includes a service intention. For example, an operator can build a consortium blockchain based on actual service needs, and deploy some online services unrelated to value transfer based on the consortium blockchain, such as anti-counterfeiting verification service, vehicle dispatching service, insurance claim settlement service, credit service, and medical service. In such a consortium blockchain, a transaction can be a service message or service request that is published by a user in the consortium blockchain and that includes a service intention.

The application client device can include any type of upper-layer application that implements a specific service function by using the bottom-layer service data stored in the blockchain as data support;

For example, when the anti-counterfeiting verification service is deployed in the blockchain, the application client device can be an APP client that implements anti-counterfeiting verification on the target product by using the anti-counterfeiting data corresponding to the target product that is stored in the blockchain as data support.

The anti-counterfeiting information can specifically include any form of data used for anti-counterfeiting verification on a target product. In a conventional anti-counterfeiting verification scenario, the anti-counterfeiting information can be a unique anti-counterfeiting identification code generated by an anti-counterfeiting authority having a cooperative relationship with a production organization of a product. In the present application, the anti-counterfeiting information can include a plurality of types of anti-counterfeiting identification information that are stored in a blockchain by a plurality of anti-counterfeiting participants and correspond to the target product.

The specific types of the plurality of anti-counterfeiting participants are not specifically limited in the present application, and any organization related to the target product can be added to the plurality of anti-counterfeiting participants.

For example, in an illustrated embodiment, the plurality of anti-counterfeiting participants can specifically include the anti-counterfeiting authority and at least one of other anti-counterfeiting participants participating in anti-counterfeiting verification with the anti-counterfeiting authority for the target product.

In this scenario, the anti-counterfeiting information can specifically include an anti-counterfeiting identification code generated by the anti-counterfeiting authority for the target product, and at least one type of anti-counterfeiting identification information that is generated by other anti-counterfeiting participants and stored in association with the anti-counterfeiting identification code;

In an illustrated embodiment, other anti-counterfeiting participants can specifically include key participants corresponding to all stages in the product life cycle of the target product; accordingly, the at least one type of anti-counterfeiting identification information that is generated by other anti-counterfeiting participants can include product descriptions related to all stages in the product life cycle of the target product.

The product lifecycle can specifically cover all stages experienced by the product from being produced to being launched to the market, and from being launched to the market to being upgraded and being withdrawn from the market.

For example, in an illustrated embodiment, the product life cycle of the target product can generally include production, inspection, etc. of the product. In this case, the key participants can include the production organization, the inspection organization, etc. of the target product. Accordingly, the at least one type of anti-counterfeiting identification information that is generated by other anti-counterfeiting participants can include a data digest of production information of the target product, a data digest of an inspection report of the target product, etc.

In this way, a single anti-counterfeiting participant can neither tamper with the data stored in the blockchain nor construct complete anti-counterfeiting information of the target product based on only the anti-counterfeiting identification information generated by the anti-counterfeiting participant; and therefore, uniqueness and credibility of the anti-counterfeiting information can be ensured. In addition, the anti-counterfeiting identification code of the target product can be associated with key stages such as production and inspection in the product life cycle of the target product, so that the product descriptions related to the key stages can be queried in the blockchain based on the anti-counterfeiting identification code of the target product.

It is worthwhile to note that the specific quantity of the anti-counterfeiting participants is not limited in the present application. In practice, a larger quantity of anti-counterfeiting participants means that the anti-counterfeiting capability of the anti-counterfeiting information formed by the plurality of types of anti-counterfeiting identification information that are stored in the blockchain by the plurality of anti-counterfeiting participants will be improved more significantly.

For example, in an illustrated embodiment, the specific quantity of the plurality of anti-counterfeiting participants can dynamically change. That is, an operator corresponding to any stage of the product life cycle of the target product can be dynamically added or deleted as an anti-counterfeiting participant.

The following describes the technical solution of the present application in detail based on an example in which the blockchain is a consortium blockchain, and the plurality of anti-counterfeiting participants include an anti-counterfeiting authority, a production organization, and an inspection organization.

Here, it is worthwhile to note that the example in which the plurality of anti-counterfeiting participants include the anti-counterfeiting authority, the production organization, and the inspection organization of the target product is merely an example.

Clearly, in the present application, the plurality of anti-counterfeiting participants can also include an anti-counterfeiting authority, a production organization, and another type of operation mechanism other than a verification mechanism capable of participating in the anti-counterfeiting verification on the target product; For example, a sales organization, an organization, a management organization, of the target product and the like are not listed in the present application.

Figure 2:
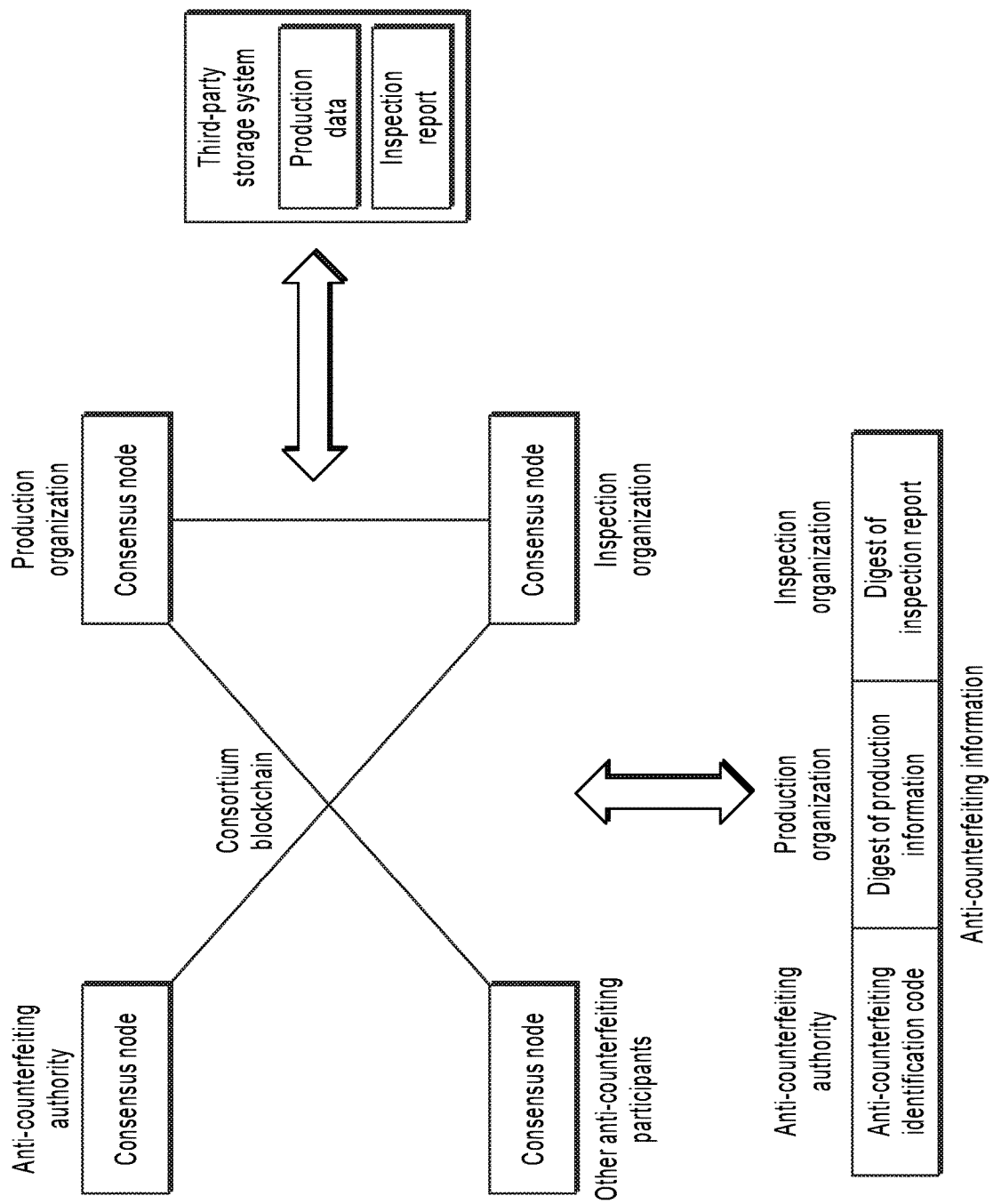
FIG. 2 is a schematic architectural diagram illustrating a consortium blockchain, according to an example embodiment.

FIG. 2 is a schematic architectural diagram illustrating a consortium blockchain, according to the present application.

As shown in FIG. 2, the anti-counterfeiting authority, the production organization, and the inspection organization of the target product can be added to the consortium blockchain as members of the consortium blockchain, and the product data related to the target product that is generated by each member as anti-counterfeiting identification information is published to the consortium blockchain in the form of a transaction, and is stored in the distributed database in the consortium blockchain after the transaction passes through the consensus processing of the consensus node in the consortium blockchain, so as to complete publishing of the anti-counterfeiting identification information to the blockchain.

The anti-counterfeiting authority can independently develop and design a unique anti-counterfeiting verification code, and publish the anti-counterfeiting verification code to the consortium blockchain in the form of a transaction, so as to publish the anti-counterfeiting verification code to the distributed database of the consortium blockchain. In addition, the anti-counterfeiting authority can construct an anti-counterfeiting label for the product produced by the production organization based on the anti-counterfeiting verification code. The specific type of the anti-counterfeiting label is not limited in the present application. For example, the anti-counterfeiting label can be an RFID label generated based on the anti-counterfeiting verification code, or a QR code label, etc.

The production organization can attach an anti-counterfeiting label generated by the anti-counterfeiting authority to the outer surface of the product to be shipped after the product is produced. In addition, the production information of the product such as a product name, a production date, a shipped date, a batch number, and a packing batch number of the product can be stored in a third-party storage system corresponding to the consortium blockchain, and a data digest (such as a hash value) of the production information of the product can be signed based on a private key and then published to the consortium blockchain in the form of a transaction, so as to publish the data digest to the distributed database of the consortium blockchain.

The inspection organization can inspect the products of each batch launched to the market by the production organization and store details about an inspection report to a third-party storage system corresponding to the consortium blockchain, and can publish the data digest of the production information of the products to the consortium blockchain in the form of a transaction after signing the data digest based on a private key, so as to publish the data digest to the distributed database of the consortium blockchain.

In an illustrated embodiment, the third-party storage system can be a content addressable storage (CAS) system. The CAS system refers to a storage system that uniquely identifies data based on the content of the stored data (such as a data digest generated based on the content of the data) without using the storage system that identifies data based on the storage location of the stored data. For example, in practice, the third-party storage system can be a CAS system such as IPFS.

In this way, when the user subsequently needs to view the production information of the product and the inspection report, the user can initiate a query to the CAS system based on the data digest in the anti-counterfeiting information of the product through an application client device to obtain the production information of the product and the original content of the inspection report.

Still referring to FIG. 2, in the present application, the anti-counterfeiting data of the target product that is stored in the consortium blockchain can include the anti-counterfeit verification code of the target product, the data digest of the production information of the target product, and the data digest of the inspection report of the target product.

After each of the anti-counterfeiting authority, the production organization, and the inspection organization published the anti-counterfeiting identification information related to the target product that is generated by the authority/organization itself to the blockchain, the application client device can obtain the anti-counterfeiting identification code that corresponds to the target product and is stored in the consortium blockchain, the data digest of the production information of the target product, and the data digest of the inspection report of the target product, and store the data digest of the production information of the target product and the data digest of the inspection report of the target product in association with the anti-counterfeiting identification code that corresponds to the target product and is stored in the consortium blockchain, so as to form the anti-counterfeiting information of the target product based on the anti-counterfeiting identification information that is stored in the consortium blockchain by the three parties.

For example, during implementation, when the anti-counterfeiting authority, the production organization, and the inspection organization store the anti-counterfeiting identification information that is generated by the authority/organization itself in the consortium blockchain, the product identification of the target product can be stored in the consortium blockchain together with the corresponding anti-counterfeiting identification information, so that the application client device can query the anti-counterfeiting identification code corresponding to the same product identification, the data digest of the production information, and the data digest of the inspection report in the consortium blockchain, so as to generate the anti-counterfeiting information of the target product.

In the present application, when the operator of the consortium blockchain deploys the anti-counterfeiting verification service in the consortium blockchain, the operator can specifically publish a smart contract related to the anti-counterfeiting verification service to the consortium blockchain.

In this case, the operator can pre-develop the smart contract related to the anti-counterfeiting service and declare in the smart contract the anti-counterfeiting service logic that needs to be triggered for execution.

For a developed smart contract, the operator of the blockchain can still publish the smart contract to the blockchain through any node device in the blockchain, and store the smart contract to the distributed database of the consortium blockchain after the smart contract passes through the consensus processing by the consensus nodes in the consortium blockchain.

Subsequently, a consumer can access any node device through an application client device, invoke the smart contract, trigger execution of the related anti-counterfeiting verification service logic in the consortium blockchain, so as to complete an anti-counterfeiting verification on the target product.

It is worthwhile to note that when a member node device in a consortium blockchain performs consensus processing on a smart contract published to the blockchain, a consensus algorithm used and a specific consensus process are omitted in the present application for simplicity, and a person skilled in the art can implement the technical solution described in the present application by referring to the descriptions in the existing technology. For example, for a consortium blockchain, an algorithm such as the PBFT algorithm, or a similar consensus algorithm can be used.

In the present application, after the target product is transferred to a consumer, the consumer can scan the anti-counterfeiting label attached to the outer surface of the product through a terminal device to obtain the anti-counterfeiting identification code carried in the anti-counterfeiting label, and then construct an anti-counterfeiting verification request for the target product based on the obtained anti-counterfeiting identification code.

It is worthwhile to note that, in practice, the anti-counterfeiting identification information used by the anti-counterfeiting authority to construct the anti-counterfeiting verification request for the target product can include one or more types of the anti-counterfeiting identification information in addition to the anti-counterfeiting identification code that is obtained by scanning the anti-counterfeiting label, which is not limited in the present application.

That is, in addition to the anti-counterfeiting identification code that is obtained by scanning the anti-counterfeiting label, the anti-counterfeiting identification request can include other types of anti-counterfeiting identification information among the plurality of types of anti-counterfeiting identification information.

After receiving the anti-counterfeiting verification request, the application client device can invoke the smart contract in response to the anti-counterfeiting verification request, so as to complete an anti-counterfeiting verification on the target product.

It is worthwhile to note, in the present application, the anti-counterfeiting verification on the target product needs to include at least an integrity verification on the anti-counterfeiting information of the target product that is published to the consortium blockchain. The integrity verification is to verify any one of the plurality of types of anti-counterfeiting identification information included in the anti-counterfeiting information of the target product, which have been stored in the consortium blockchain, is missing.

In an illustrated embodiment, the anti-counterfeiting verification on the target product can specifically include both an integrity verification and a validity verification on the anti-counterfeiting information of the target product.

During implementation, after receiving the anti-counterfeiting verification request, the application client device can read the anti-counterfeiting identification code carried in the anti-counterfeiting verification request, and submit the anti-counterfeiting verification code to the public contract address of the smart contract to invoke the smart contract, so as to trigger execution of the anti-counterfeiting verification service logic declared in the smart contract to complete the anti-counterfeiting verification on the target product.

After receiving the anti-counterfeiting identification code submitted by the application client device, the smart contract can first perform validity verification on the read anti-counterfeiting identification code, where the validity verification on the anti-counterfeiting identification code can generally include a uniqueness verification on the anti-counterfeiting identification code.

For example, in practice, the hash value of the read anti-counterfeiting identification code can be calculated, and a query is initiated in the consortium blockchain based on the hash value to determine whether a unique anti-counterfeiting identification code corresponding to the hash value is stored in the consortium blockchain; and if so, it means that the anti-counterfeiting identification code passes the validity verification.

After the anti-counterfeiting identification code carried in the anti-counterfeiting verification request passes the validity verification, the smart contract can further perform an integrity verification on the anti-counterfeiting information of the target product, and initiate a query in the consortium blockchain based on the anti-counterfeiting identification code in the anti-counterfeiting verification request to detect a data digest of the production information of the target product that is stored in association with the anti-counterfeiting identification code and a data digest of the inspection report of the target product.

If the data digest of the production information of the target product that is stored in association with the anti-counterfeiting identification code and the data digest of the inspection report of the target product are detected, it indicates that the plurality of types of anti-counterfeiting identification information included in the anti-counterfeiting information of the target product, which are stored in the consortium blockchain, are complete, and the anti-counterfeiting information of the target product passes the integrity verification.

If the data digest of the production information of the target product that is stored in association with the anti-counterfeiting identification code and the data digest of the inspection report of the target product are not detected, it indicates that the anti-counterfeiting information of the target product does not pass the integrity verification. In this case, the anti-counterfeiting verification result indicating that the target product is a fake or counterfeit product can be returned to the user through the application client device. For example, the anti-counterfeiting verification result can be a text message "The product is a fake or counterfeit product".

Further, if the anti-counterfeiting information of the target product passes the integrity verification, the smart contract can further perform a validity verification on the detected data digest of the production information of the target product that is stored in association with the anti-counterfeiting identification code and the data digest of the inspection report of the target product.

The validity verification on the data digest of the production information of the target product and the data digest of the inspection report of the target product can generally include verifying the data digest of the production information of the target product and a signature carried in the data digest of the inspection report of the target product.

For example, the smart contract can verify, based on a public key corresponding to a private key held by the production organization and the inspection organization, a data digest of the production information of the target product and a signature carried in the data digest of the inspection report of the target product. If the verification is passed, it indicates that the data digest of the production information of the target product and the data digest of the inspection report of the target product pass the validity verification.

If the data digest of the production information of the target product and the data digest of the inspection report of the target product pass the validity verification, the anti-counterfeiting verification on the target product is completed, and the target product passes the anti-counterfeiting verification. In this case, an anti-counterfeiting verification result indicating that the target product is a genuine product can be returned to the user through the application client device. For example, the anti-counterfeiting verification result can be a text message "The product is a genuine product".

Accordingly, if the data digest of the production information of the target product and the data digest of the inspection report of the target product do not pass the validity verification (for example, the signature is incorrect), the target product does not pass the anti-counterfeiting verification. In this case, the application client device can return the anti-counterfeiting verification result indicating that the target product is a fake or counterfeit product to the user.

Further, it is worthwhile to note that when a new organization is added to the plurality of anti-counterfeiting participants as an anti-counterfeiting participant, the application client device can reorganize the plurality of types of anti-counterfeiting identification information published to the consortium blockchain into the anti-counterfeiting information of the target product in the previously described method, so as to update the original anti-counterfeiting information.

For example, assuming that a sales organization of the target product also adds sales information generated by the sales organization of the target product to the plurality of anti-counterfeiting participants as an anti-counterfeiting participant, the sales information generated by the sales organization of the target product is also added to the anti-counterfeiting information as anti-counterfeiting identification information included in the anti-counterfeiting information.

Accordingly, if the quantity of the anti-counterfeiting participants changes, and new anti-counterfeiting identification information is added to the anti-counterfeiting identification information included in the anti-counterfeiting information, the anti-counterfeiting verification logic for the anti-counterfeiting information also changes. In this case, the operator of the consortium blockchain can deploy a new smart contract in the consortium blockchain to perform anti-counterfeiting verification on the anti-counterfeiting information of the target product.

In another illustrated embodiment, when the user scans the anti-counterfeiting label through a terminal device, the application client device can also generating a user scanning record for the anti-counterfeiting label in response to the user scanning operation for the anti-counterfeiting label; and then store the generated scanning record in the consortium blockchain in the form of a transaction.

In this way, the user can record the scanning record of the anti-counterfeiting label in the consortium blockchain, so that the scanning record of the anti-counterfeiting label of the target product can be traced during the circulation of the target product.

As can be seen from the previous embodiments, in the present application, the anti-counterfeiting information related to the target product that is stored in the blockchain includes a plurality of types of anti-counterfeiting identification information that correspond to the target product and is stored in the blockchain by a plurality of anti-counterfeiting participants, and a single anti-counterfeiting identification code is no longer used as the anti-counterfeiting information.

In addition, an integrity verification on the anti-counterfeiting information stored in the blockchain is included in the anti-counterfeiting verification on the target product.

Therefore, even if some of true anti-counterfeiting identification information among a plurality of types of anti-counterfeiting identification information is leaked, the anti-counterfeiting identification information generated for a fake or counterfeit product based on the leaked anti-counterfeiting identification information cannot pass the integrity verification of the anti-counterfeiting information for the product, so that the security level of the product anti-counterfeiting is significantly improved.

For example, when the anti-counterfeiting information includes the anti-counterfeiting identification code of the target product, the data digest of the production information of the target product, and the data digest of the inspection report of the target product, even if the anti-counterfeiting identification code of the target product is leaked, and a product counterfeiter constructs a legal anti-counterfeiting label based on the leaked anti-counterfeiting identification code, during the anti-counterfeiting verification on the target product based on the anti-counterfeiting identification code obtained by scanning the anti-counterfeiting label on the target product, because the data digest of the production information of the target product that is stored in association with the anti-counterfeiting identification code and the data digest of the inspection report of the target product may not be stored in the consortium blockchain, the integrity verification based on the anti-counterfeiting information fails. Therefore, during the anti-counterfeiting verification, the fake or counterfeit product containing the legal anti-counterfeiting label is still identified as a fake or counterfeit product.

Figure 3:
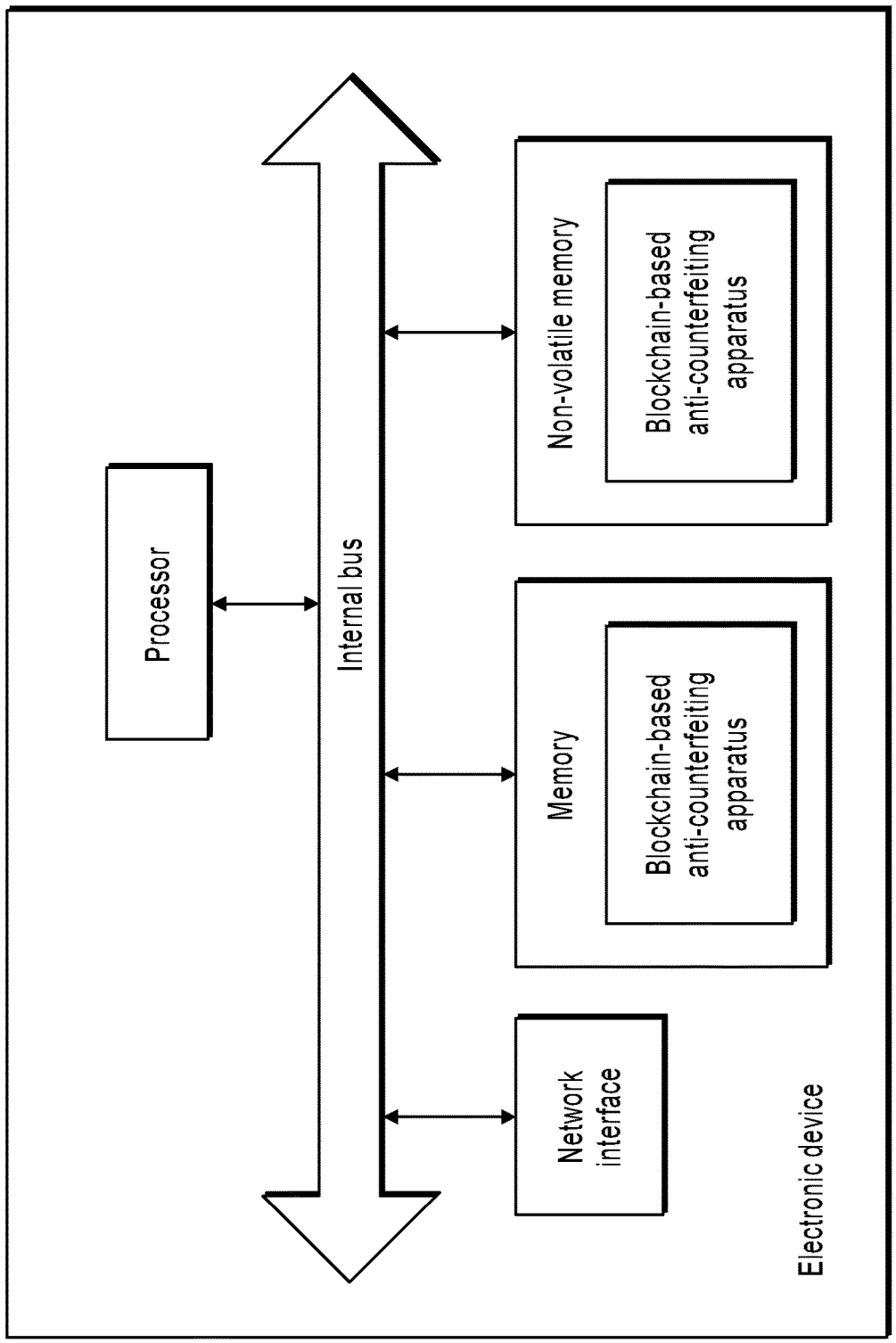
FIG. 3 is a schematic structural diagram illustrating an electronic device, according to an example embodiment.

Corresponding to the previously described method embodiments, the present application further provides an embodiment of a blockchain-based anti-counterfeiting apparatus. The embodiment of the blockchain-based anti-counterfeiting apparatus in the present application can be applied to an electronic device. The apparatus embodiment can be implemented by using software, hardware, or a combination of software and hardware. The software implementation is used as an example. As a logical apparatus, the apparatus is formed by reading the corresponding computer program instructions in the non-volatile memory by the processor of the electronic device into the memory for execution. In terms of hardware, FIG. 3 is a diagram illustrating a hardware structure of an electronic device in which a blockchain-based anti-counterfeiting apparatus is located. In addition to a processor, a memory, a network interface, and a non-volatile memory shown in FIG. 3, the electronic device can generally include other hardware based on other actual functions of the electronic device. Details are omitted here for simplicity.

Figure 4:
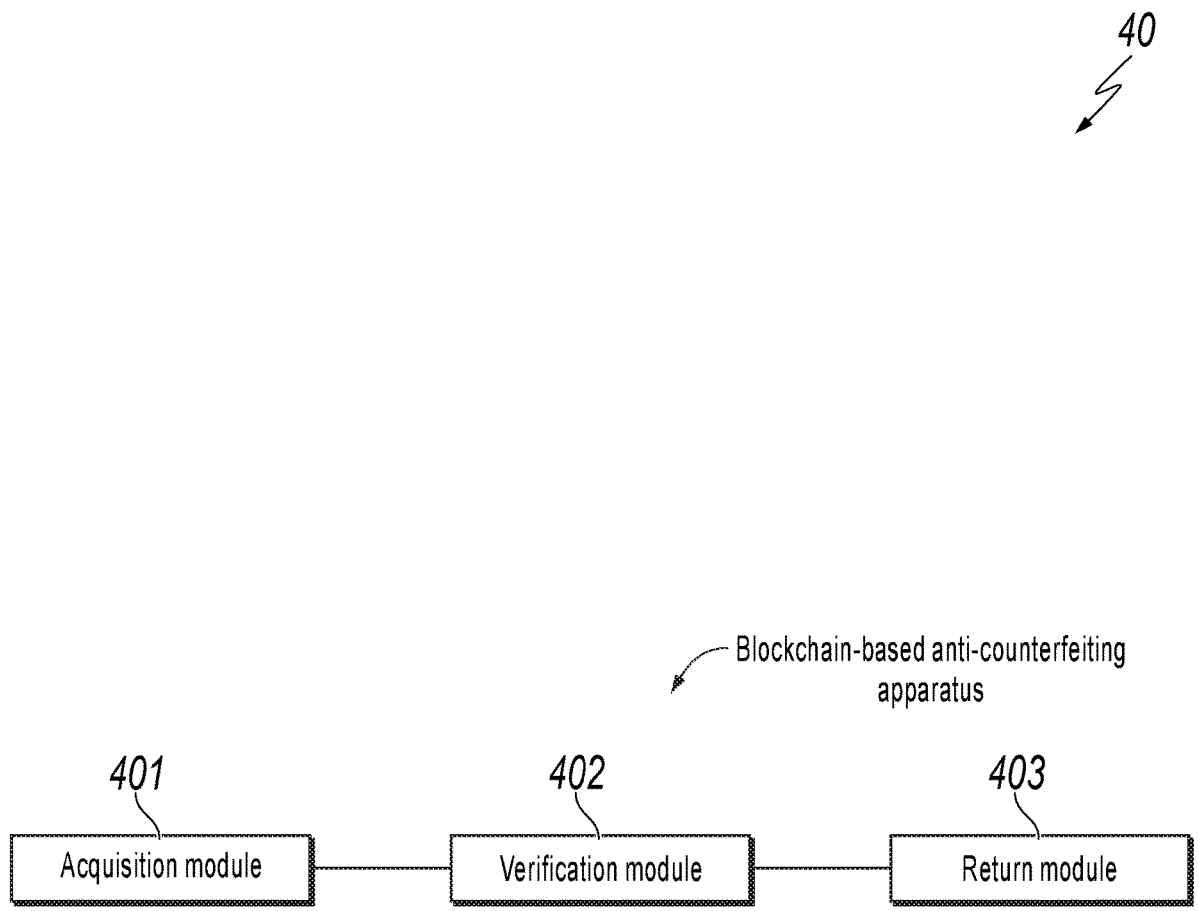
FIG. 4 is a block diagram illustrating a blockchain-based anti-counterfeiting apparatus, according to an example embodiment.

FIG. 4 is a block diagram illustrating a blockchain-based anti-counterfeiting apparatus, according to an example embodiment of the present application.

Referring to FIG. 4, a blockchain-based anti-counterfeiting apparatus 40 can be applied to the electronic device shown in FIG. 3, where the blockchain stores anti-counterfeiting information corresponding to a target product, and the anti-counterfeiting information includes a plurality of types of anti-counterfeiting identification information that correspond to the target product and are stored in the blockchain by a plurality of anti-counterfeiting participants. The apparatus 40 includes: an acquisition module 401, configured to obtain an anti-counterfeiting verification request submitted by a user for the target product; a verification module 402, configured to initiate an anti-counterfeiting verification on the target product in response to the anti-counterfeiting verification request, where the anti-counterfeiting verification includes at least an integrity verification on the anti-counterfeiting information; and a return module 403, configured to return an anti-counterfeiting verification result for the target product to the user.

In this embodiment, the anti-counterfeiting information includes an anti-counterfeiting identification code generated by the anti-counterfeiting authority for the target product, and at least one type of anti-counterfeiting identification information that is generated by other anti-counterfeiting participants and stored in association with the anti-counterfeiting identification code.

In this embodiment, the target product is attached with an anti-counterfeiting label generated based on the anti-counterfeiting identification code; and the anti-counterfeiting verification request includes the anti-counterfeiting identification code obtained by a user by scanning the anti-counterfeiting label; and the verification module 402 is configured to: initiate a query in the blockchain based on the anti-counterfeiting identification code in the anti-counterfeiting verification request in response to the anti-counterfeiting verification request, to detect the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants and stored in association with the anti-counterfeiting identification code is detected.

In this embodiment, the verification module 402 is further configured to: before initiating a query in the blockchain based on the anti-counterfeiting identification code in the anti-counterfeiting verification request, perform a validity verification on the anti-counterfeiting identification code in the anti-counterfeiting verification request; and further initiate a query in the blockchain based on the anti-counterfeiting identification code if the anti-counterfeiting identification code passes the validity verification.

In this embodiment, the verification module 402 is further configured to:

further perform a validity verification on the at least one type of anti-counterfeiting identification information that is generated by other anti-counterfeiting participants if the blockchain stores the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants passes the validity verification.

In this embodiment, the apparatus 40 further includes: a generation module 404 (not shown in FIG. 4), configured to: generate a user scanning record for the anti-counterfeiting label in response to the user scanning operation for the anti-counterfeiting label; and publish the generated scanning record to the blockchain for storage.

In this embodiment, other anti-counterfeiting participants include key participants corresponding to all stages in the product life cycle of the target product; and the at least one type of anti-counterfeiting identification information that is generated by other anti-counterfeiting participants includes product descriptions related to all stages in the product life cycle of the target product.

In this embodiment, the key participants include a production organization and an inspection organization of the target product; and the at least one type of anti-counterfeiting identification information that is generated by other anti-counterfeiting participants includes a data digest of production information of the target product and a data digest of an inspection report of the target product.

In this embodiment, the production information of the target product and the inspection report of the target product are stored in a third-party storage system interfaced with the blockchain, where the third-party storage system is a content addressable storage system.

In this embodiment, the blockchain is a consortium blockchain.

Because the apparatus embodiment basically corresponds to the method embodiment, for the related parts, references can be made to the description of the method embodiment. The previously described apparatus embodiment is merely an example, where the units described as separate parts can or cannot be physically separate, and components displayed as units can or cannot be physical units, and can be located in one place or can be distributed on a plurality of network units. Based on the practical needs, some or all of these modules can be selected to implement the purpose of the present application. A person of ordinary skill in the art can understand and implement the technical solutions in some embodiments without creative efforts.

The system, apparatuses, module, or unit illustrated in the previously described embodiments can be implemented by using a computer chip or an entity, or can be implemented by using a product with a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of at least two of these devices.

Corresponding to the previously described method embodiment, the present application further provides an embodiment of an electronic device. The electronic device includes a processor and a memory configured to store a machine executable instruction, where the processor and memory are usually connected to each other through an internal bus. In other possible embodiments, the electronic device can also include an external interface used to communicate with other devices or components.

In this embodiment, by reading and executing the machine executable instructions that are stored in the memory and that correspond to a control logic for blockchain-based anti-counterfeiting, the processor is enabled to: obtain an anti-counterfeiting verification request submitted by a user for the target product, where the blockchain stores anti-counterfeiting information corresponding to a target product, and the anti-counterfeiting information includes a plurality of types of anti-counterfeiting identification information that correspond to the target product and are stored in the blockchain by a plurality of anti-counterfeiting participants; initiate an anti-counterfeiting verification on the target product in response to the anti-counterfeiting verification request, where the anti-counterfeiting verification includes at least an integrity verification on the anti-counterfeiting information; and return an anti-counterfeiting verification result for the target product to the user.

In this embodiment, the anti-counterfeiting information includes an anti-counterfeiting identification code generated by the anti-counterfeiting authority for the target product, and at least one type of anti-counterfeiting identification information that is generated by other anti-counterfeiting participants and stored in association with the anti-counterfeiting identification code; the target product is attached with an anti-counterfeiting label generated based on the anti-counterfeiting identification code; and the anti-counterfeiting verification request includes the anti-counterfeiting identification code obtained by the user by scanning the anti-counterfeiting label; and by reading and executing the machine executable instructions that are stored in the memory and that correspond to a control logic for blockchain-based anti-counterfeiting, the processor is enabled to: initiate a query in the blockchain based on the anti-counterfeiting identification code in the anti-counterfeiting verification request in response to the anti-counterfeiting verification request, to detect the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants and stored in association with the anti-counterfeiting identification code is detected.

In this embodiment, by reading and executing the machine executable instructions that are stored in the memory and that correspond to a control logic for blockchain-based anti-counterfeiting, the processor is enabled to: before initiating a query in the blockchain based on the anti-counterfeiting identification code in the anti-counterfeiting verification request, perform a validity verification on the anti-counterfeiting identification code in the anti-counterfeiting verification request; and further initiate a query in the blockchain based on the anti-counterfeiting identification code if the anti-counterfeiting identification code passes the validity verification.

In this embodiment, by reading and executing the machine executable instructions that are stored in the memory and that correspond to a control logic for blockchain-based anti-counterfeiting, the processor is enabled to: further perform a validity verification on the at least one type of anti-counterfeiting identification information that is generated by other anti-counterfeiting participants if the blockchain stores the at least one type of anti-counterfeiting identification information that is generated by other anti-counterfeiting participants and stored in association with the anti-counterfeiting identification code; and determine that the target product passes the anti-counterfeiting verification if the at least one type of anti-counterfeiting identification information that is generated by other anti-counterfeiting participants passes the validity verification.

In this embodiment, by reading and executing the machine executable instructions that are stored in the memory and that correspond to a control logic for blockchain-based anti-counterfeiting, the processor is enabled to: generate a user scanning record for the anti-counterfeiting label in response to the user scanning operation for the anti-counterfeiting label; and publish the generated scanning record to the blockchain for storage.

A person skilled in the art can easily figure out other embodiments of the present application after considering and practicing the present application disclosed here. The present application is intended to cover any variations, usage, or adaptations of the present application that follow the general principles of the present application and include common general knowledge or commonly used technical means in the art that are not disclosed in the present application. The present application and embodiments are merely examples. The protection scope and spirit of the present application are indicated by the following claims.

It should be understood that the present application is not limited to the precise structures already described above and illustrated in the accompanying drawings, and various modifications and changes can be made without departing from the scope thereof. The protection scope of the present application should be defined by the appended claims.

The above descriptions are merely preferred embodiments of one or more embodiments of the present application, and are not intended to limit the present application. Any modification, equivalent replacement, improvement, etc., made without departing from the spirit and principles of the present application shall fall within the protection scope of the present application.

What is claimed is:

1. A computer-implemented method for anti-counterfeiting, comprising:

receiving, by a client device, an anti-counterfeiting verification request submitted by a user for a product, wherein the anti-counterfeiting verification request comprises an anti-counterfeiting identification code;

in response to receiving the anti-counterfeiting verification request, performing, by the client device based on invoking a smart contract, operations for an anti-counterfeiting verification of the product comprising:

performing an integrity verification of anti-counterfeiting information recorded on a blockchain, wherein the anti-counterfeiting information comprises a plurality of types of anti-counterfeiting identification information corresponding to a plurality of participants maintaining the blockchain, wherein the plurality of types of anti-counterfeiting identification information comprise the anti-counterfeiting identification code;

obtaining, from the blockchain and based on the anti-counterfeiting identification code, a first data digest, wherein the first data digest corresponds to a first type of the plurality of types of anti-counterfeiting identification information, wherein the first data digest uniquely corresponds to a first participant of the plurality of participants, wherein the first participant of the plurality of participants corresponds to a first stage of a product life cycle of the product, and wherein the first participant maintains a first service node of a blockchain network for the blockchain;

verifying, based on a first public key corresponding to the first participant, the first data digest, wherein the first data digest is signed using a first private key corresponding to the first participant;

obtaining, from the blockchain and based on the anti-counterfeiting identification code, a second data digest, wherein the second data digest corresponds to a second type of the plurality of types of anti-counterfeiting identification information, wherein the second data digest uniquely corresponds to a second participant of the plurality of participants, wherein the second participant of the plurality of participants corresponds to a second stage of the product life cycle of the product, and wherein the second participant maintains a second service node of the blockchain network; and verifying, based on a second public key corresponding to the second participant, the second data digest, wherein the second data digest is signed using a second private key corresponding to the second participant;

sending, by the client device, an anti-counterfeiting verification result for the product to the user indicating successful verification of the first data digest and the second data digest;

in response to the successful verification, identifying, by the client device, product information from a third-party content addressable storage device accessible to the blockchain by using a user query to the third-party content addressable storage device, wherein the user query comprises the first data digest; and sending, by the client device, the product information to the user.

2. The computer-implemented method according to claim 1, wherein the anti-counterfeiting identification code is generated by an authority party associated with the product, and at least one type of the plurality of types of anti-counterfeiting identification information is generated by at least one participant and stored in association with the anti-counterfeiting identification code on the blockchain.

3. The computer-implemented method according to claim 2, wherein an anti-counterfeiting label is attached to the product, wherein the anti-counterfeiting label is generated based on the anti-counterfeiting identification code, the anti-counterfeiting identification code is obtained by scanning the anti-counterfeiting label, and initiating the anti-counterfeiting verification on the product comprises:

initiating a query on the blockchain based on the anti-counterfeiting identification code in response to receiving the anti-counterfeiting verification request;

receiving the at least one type of the plurality of types of anti-counterfeiting identification information on the blockchain; and determining that the anti-counterfeiting verification of the product is successful based on determining that the at least one type of the plurality of types of anti-counterfeiting identification information is on the blockchain.

4. The computer-implemented method according to claim 3, wherein determining that the anti-counterfeiting verification of the product is successful comprises:

performing a validity verification of the at least one type of the plurality of types of anti-counterfeiting identification information generated by the at least one participant; and determining that the anti-counterfeiting verification is successful based on the validity verification being successful.

5. The computer-implemented method according to claim 2, wherein the plurality of participants comprise a product manufacturer and a product inspector, and the at least one type of the plurality of types of anti-counterfeiting identification information comprises a data digest of an inspection report of the product.

6. The computer-implemented method according to claim 5, wherein the inspection report is stored in the third-party content addressable storage device accessible to the blockchain.

7. A non-transitory, computer-readable medium storing one or more instructions executable by a computer system to perform operations comprising:

receiving, by a client device, an anti-counterfeiting verification request submitted by a user for a product, wherein the anti-counterfeiting verification request comprises an anti-counterfeiting identification code;

in response to receiving the anti-counterfeiting verification request, performing, by the client device based on invoking a smart contract, operations for an anti-counterfeiting verification of the product comprising:

performing an integrity verification of anti-counterfeiting information recorded on a blockchain, wherein the anti-counterfeiting information comprises a plurality of types of anti-counterfeiting identification information corresponding to a plurality of participants maintaining the blockchain, wherein the plurality of types of anti-counterfeiting identification information comprise the anti-counterfeiting identification code;

obtaining, from the blockchain and based on the anti-counterfeiting identification code, a first data digest, wherein the first data digest corresponds to a first type of the plurality of types of anti-counterfeiting identification information, wherein the first data digest uniquely corresponds to a first participant of the plurality of participants, wherein the first participant of the plurality of participants corresponds to a first stage of a product life cycle of the product, and wherein the first participant maintains a first service node of a blockchain network for the blockchain;

verifying, based on a first public key corresponding to the first participant, the first data digest, wherein the first data digest is signed using a first private key corresponding to the first participant;

obtaining, from the blockchain and based on the anti-counterfeiting identification code, a second data digest, wherein the second data digest corresponds to a second type of the plurality of types of anti-counterfeiting identification information, wherein the second data digest uniquely corresponds to a second participant of the plurality of participants, wherein the second participant of the plurality of participants corresponds to a second stage of the product life cycle of the product, and wherein the second participant maintains a second service node of the blockchain network; and verifying, based on a second public key corresponding to the second participant, the second data digest, wherein the second data digest is signed using a second private key corresponding to the second participant;

sending, by the client device, an anti-counterfeiting verification result for the product to the user indicating successful verification of the first data digest and the second data digest;

in response to the successful verification, identifying, by the client device, product information from a third-party content addressable storage device accessible to the blockchain by using a user query to the third-party content addressable storage device, wherein the user query comprises the first data digest; and sending, by the client device, the product information to the user.

8. The non-transitory, computer-readable medium according to claim 7, wherein the anti-counterfeiting identification code is generated by an authority party associated with the product, and at least one type of the plurality of types of anti-counterfeiting identification information is generated by at least one participant and stored in association with the anti-counterfeiting identification code on the blockchain.

9. The non-transitory, computer-readable medium according to claim 8, wherein an anti-counterfeiting label is attached to the product, wherein the anti-counterfeiting label is generated based on the anti-counterfeiting identification code, the anti-counterfeiting identification code is obtained by scanning the anti-counterfeiting label, and initiating the anti-counterfeiting verification on the product comprises:

initiating a query on the blockchain based on the anti-counterfeiting identification code in response to receiving the anti-counterfeiting verification request;

receiving the at least one type of the plurality of types of anti-counterfeiting identification information on the blockchain; and determining that the anti-counterfeiting verification of the product is successful based on determining that the at least one type of the plurality of types of anti-counterfeiting identification information is on the blockchain.

10. The non-transitory, computer-readable medium according to claim 9, wherein determining that the anti-counterfeiting verification of the product is successful comprises:

performing a validity verification of the at least one type of the plurality of types of anti-counterfeiting identification information generated by the at least one participant; and determining that the anti-counterfeiting verification is successful based on the validity verification being successful.

11. The non-transitory, computer-readable medium according to claim 8, wherein the plurality of participants comprise a product manufacturer and a product inspector, and the at least one type of the plurality of types of anti-counterfeiting identification information comprises a data digest of an inspection report of the product.

12. The non-transitory, computer-readable medium according to claim 11, wherein the inspection report is stored in the third-party content addressable storage device accessible to the blockchain.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a client device, an anti-counterfeiting verification request submitted by a user for a product, wherein the anti-counterfeiting verification request comprises an anti-counterfeiting identification code;

in response to receiving the anti-counterfeiting verification request, performing, by the client device based on invoking a smart contract, operations for an anti-counterfeiting verification of the product comprising:

performing an integrity verification of anti-counterfeiting information recorded on a blockchain, wherein the anti-counterfeiting information comprises a plurality of types of anti-counterfeiting identification information corresponding to a plurality of participants maintaining the blockchain, wherein the plurality of types of anti-counterfeiting identification information comprise the anti-counterfeiting identification code;

obtaining, from the blockchain and based on the anti-counterfeiting identification code, a first data digest, wherein the first data digest corresponds to a first type of the plurality of types of anti-counterfeiting identification information, wherein the first data digest uniquely corresponds to a first participant of the plurality of participants, wherein the first participant of the plurality of participants corresponds to a first stage of a product life cycle of the product, and wherein the first participant maintains a first service node of a blockchain network for the blockchain;

verifying, based on a first public key corresponding to the first participant, the first data digest, wherein the first data digest is signed using a first private key corresponding to the first participant;

obtaining, from the blockchain and based on the anti-counterfeiting identification code, a second data digest, wherein the second data digest corresponds to a second type of the plurality of types of anti-counterfeiting identification information, wherein the second data digest uniquely corresponds to a second participant of the plurality of participants, wherein the second participant of the plurality of participants corresponds to a second stage of the product life cycle of the product, and wherein the second participant maintains a second service node of the blockchain network; and verifying, based on a second public key corresponding to the second participant, the second data digest, wherein the second data digest is signed using a second private key corresponding to the second participant;

sending, by the client device, an anti-counterfeiting verification result for the product to the user indicating successful verification of the first data digest and the second data digest;

in response to the successful verification, identifying, by the client device, product information from a third-party content addressable storage device accessible to the blockchain by using a user query to the third-party content addressable storage device, wherein the user query comprises the first data digest; and sending, by the client device, the product information to the user.

14. The computer-implemented system according to claim 13, wherein the anti-counterfeiting identification code is generated by an authority party associated with the product, and at least one type of the plurality of types of anti-counterfeiting identification information is generated by at least one participant and stored in association with the anti-counterfeiting identification code on the blockchain.

15. The computer-implemented system according to claim 14, wherein an anti-counterfeiting label is attached to the product, wherein the anti-counterfeiting label is generated based on the anti-counterfeiting identification code, the anti-counterfeiting identification code is obtained by scanning the anti-counterfeiting label, and initiating the anti-counterfeiting verification on the product comprises:
- initiating a query on the blockchain based on the anti-counterfeiting identification code in response to receiving the anti-counterfeiting verification request;
- receiving the at least one type of the plurality of types of anti-counterfeiting identification information on the blockchain; and
- determining that the anti-counterfeiting verification of the product is successful based on determining that the at least one type of the plurality of types of anti-counterfeiting identification information is detected on the blockchain.

16. The computer-implemented system according to claim 15, wherein determining that the anti-counterfeiting verification of the product is successful comprises:
- performing a validity verification of the at least one type of the plurality of types of anti-counterfeiting identification information generated by the at least one participant; and
- determining that the anti-counterfeiting verification is successful based on the validity verification being successful.

17. The computer-implemented system according to claim 14, wherein the at least one participant comprise a product manufacturer and a product inspector, and the at least one type of the plurality of types of anti-counterfeiting identification information comprises a data digest of an inspection report of the product.

18. The computer-implemented system according to claim 17, wherein the inspection report is stored in the third-party content addressable storage device accessible to the blockchain.

* * * * *